(12) United States Patent
Imagawa

(10) Patent No.: US 8,908,965 B2
(45) Date of Patent: Dec. 9, 2014

(54) IMAGE PROCESSOR, IMAGE PROCESSING METHOD, IMAGE PROCESSING PROGRAM, AND CHIP CIRCUIT

(71) Applicant: Panasonic Corporation, Osaka (JP)

(72) Inventor: Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 24 days.

(21) Appl. No.: 13/759,596

(22) Filed: Feb. 5, 2013

(65) Prior Publication Data
US 2013/0329999 A1 Dec. 12, 2013

(30) Foreign Application Priority Data

Jun. 8, 2012 (JP) .................................. 2012-130577
Nov. 22, 2012 (JP) .................................. 2012-255986

(51) Int. Cl.
*G06K 9/00* (2006.01)
*G06K 9/40* (2006.01)
*G06T 5/00* (2006.01)

(52) U.S. Cl.
CPC .... *G06K 9/40* (2013.01); *G06T 5/00* (2013.01)
USPC .......................................... 382/167; 382/264

(58) Field of Classification Search
USPC ......... 382/162, 167, 176, 254, 264, 268, 275; 348/606–625, 700
See application file for complete search history.

(56) References Cited

U.S. PATENT DOCUMENTS

| | | | | |
|---|---|---|---|---|
| 5,327,246 | A | * | 7/1994 | Suzuki ........................... 348/246 |
| 5,671,264 | A | | 9/1997 | Florent et al. |
| 6,108,455 | A | * | 8/2000 | Mancuso ........................ 382/261 |
| 6,151,420 | A | * | 11/2000 | Wober et al. ................... 382/275 |
| 2003/0228067 | A1 | | 12/2003 | Miyake et al. |
| 2011/0311155 | A1 | | 12/2011 | Miyake et al. |

FOREIGN PATENT DOCUMENTS

JP 09-138849 A 5/1997
JP 2004-015322 A 1/2004

OTHER PUBLICATIONS

Tomasi, C. et al. "Bilateral Filtering for Gray and Color Images." Proceedings of the 1998 IEEE International Conference on Computer Vision, Bombay, India. 8 pages.

* cited by examiner

*Primary Examiner* — Yon Couso
(74) *Attorney, Agent, or Firm* — McDermott Will & Emery LLP

(57) ABSTRACT

An image processor includes: a first calculator configured to calculate similarity between a first region including a target pixel and a second region including a reference pixel and calculate a multiplication coefficient which increases as the similarity increases; a second calculator configured to calculate a random number; a sum-of-products arithmetic unit configured to multiply a pixel value of each reference pixel by the multiplication coefficient and the random number and compute a sum of the products; a coefficient summation unit configured to multiply the multiplication coefficient by the random number and compute a sum of the products; and a division unit configured to divide the result of the sum-of-products arithmetic unit by the result of the coefficient summation unit.

13 Claims, 10 Drawing Sheets

FIG.5A
| R | G | R | G | R | G | R | G |
|---|---|---|---|---|---|---|---|
| W | B | W | B | W | B | W | B |
| R | G | R | G | R | G | R | G |
| W | B | W | B | W | B | W | B |
| R | G | R | G | R | G | R | G |
| W | B | W | B | W | B | W | B |
| R | G | R | G | R | G | R | G |
| W | B | W | B | W | B | W | B |
21  20
FIG.5B
| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
21  20
FIG.6A
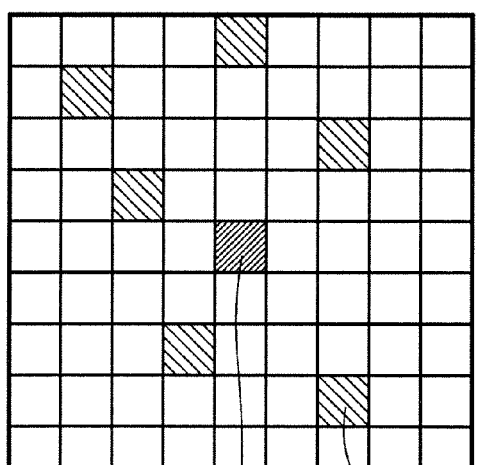
20  21
FIG.6B
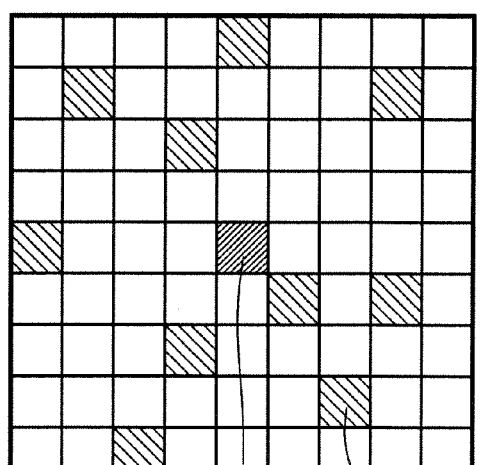
20  21

20  21

20  21

20  21

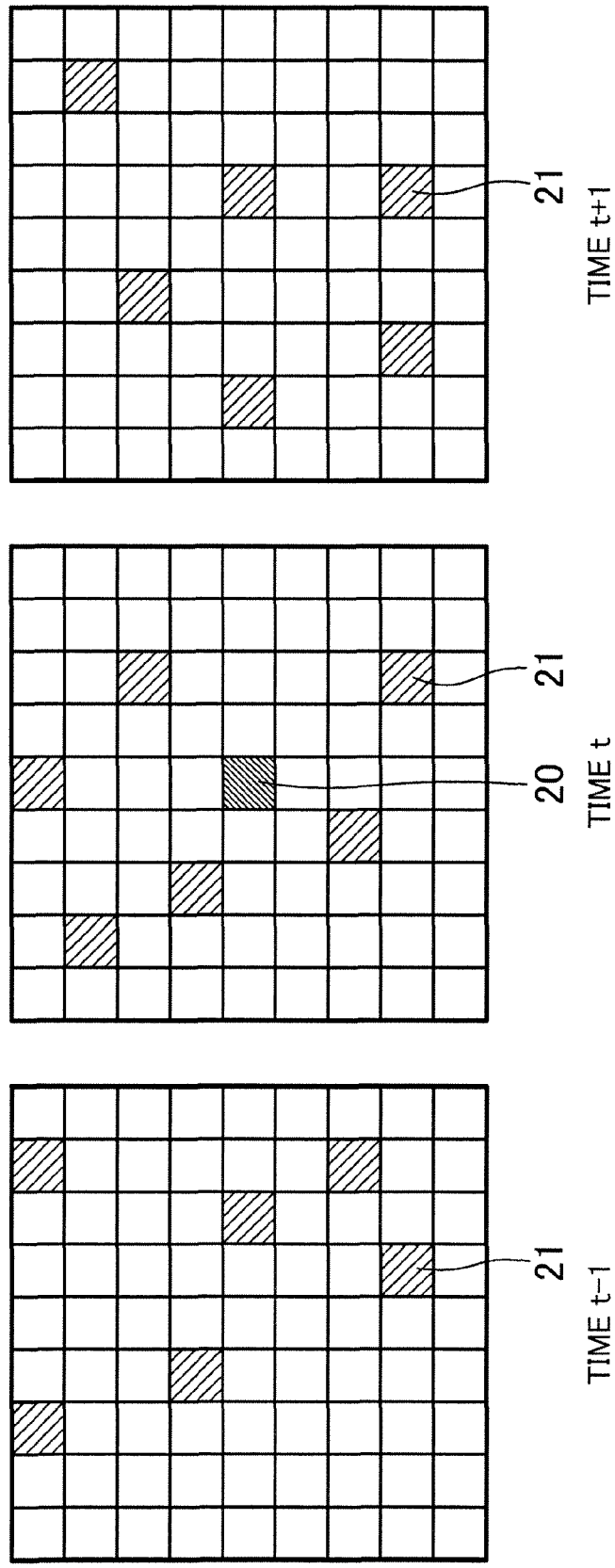

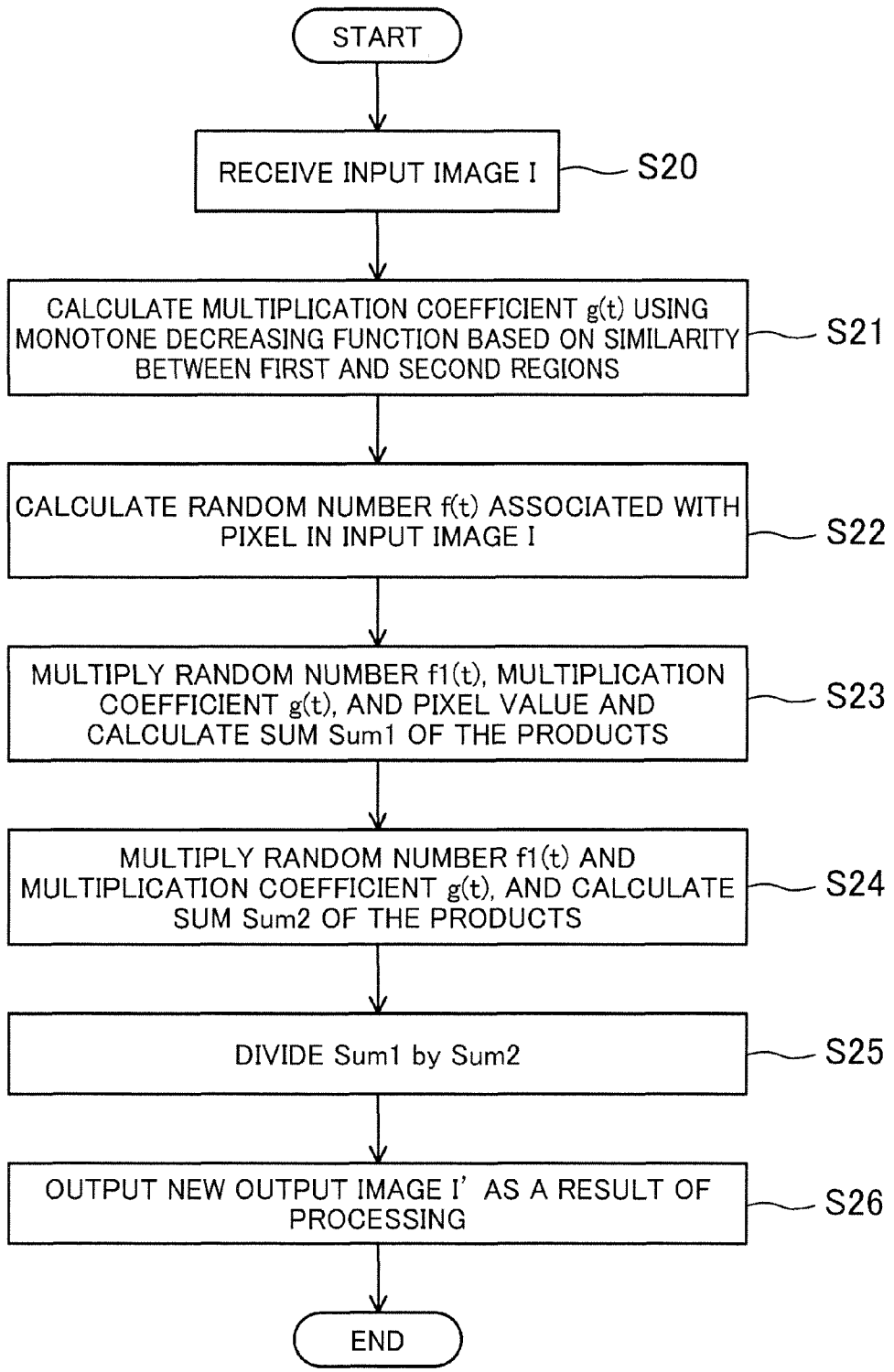

IMAGE PROCESSOR, IMAGE PROCESSING METHOD, IMAGE PROCESSING PROGRAM, AND CHIP CIRCUIT

CROSS-REFERENCE TO RELATED APPLICATIONS

This application claims priority to Japanese Patent Applications No. 2012-130577 filed on Jun. 8, 2012 and No. 2012-255986 filed on Nov. 22, 2012, the entire disclosure of which is incorporated by reference herein.

BACKGROUND

The present disclosure relates to image processor for reducing noise included in captured images.

Japanese Patent Publication No. H09-138849 describes an image processor in which axes are spatially arranged in a random manner from a target pixel in an image and pixels on the axes are subjected to noise smoothing. This technique can reduce uneven distribution, to a low-frequency range, of frequency components of noise included in a processed image.

Another image processing technique of performing noise smoothing in consideration of the difference in pixel value between a target pixel and its adjacent pixels in an image is described in C. Tomash and R. Maduchi, "Bilateral Filtering for Gray and Color Images," Proceedings of the 1998 IEEE International Conference on Computer Vision, Bombay, India. This technique can reduce noise, while preserving a pattern in the image.

SUMMARY

The present disclosure provides an image processor capable of reducing noise included in an image while maintaining frequency distribution characteristics of the noise.

An image processor for performing noise smoothing on an input image according to the present disclosure includes: a first calculator configured to calculate, for each of reference pixels selected at random with respect to a target image in the input image, similarity between a first region including the target pixel and a second region including the reference pixel, and using the similarity, calculate a multiplication coefficient which increases as the similarity increases; a second calculator configured to calculate a random number assigned to each of the reference pixels; a sum-of-products arithmetic unit configured to perform a multiplication of a pixel value of each of the reference pixels by the multiplication coefficient for the reference pixel and the random number assigned to the reference pixel and perform the multiplication for the reference pixels to generate products, and compute a sum of the products; a coefficient summation unit configured to perform a multiplication of the multiplication coefficient for each of the reference pixels by the random number assigned to the reference pixel and perform the multiplication for the reference pixels to generate products, and compute a sum of the products; and a division unit configured to divide the sum obtained by the sum-of-products arithmetic unit by the sum obtained by the coefficient summation unit, and output a result of the division as a pixel value of the target pixel.

An image processor according to the present disclosure can reduce noise included in an image while maintaining frequency distribution characteristics of the noise.

BRIEF DESCRIPTION OF THE DRAWINGS

FIGS. 5A and 5B illustrate examples of images obtained through color filter arrays and pixels in the images.

FIGS. 6A and 6B illustrate examples of selection of reference pixels in a luminance image and a color difference image.

FIGS. 8A-8C illustrate examples of selection of a target pixel and reference pixels in a plurality of images.

FIG. 9 is a flowchart showing operation of the image processor in a case where a plurality of images are input.

DETAILED DESCRIPTION

Embodiments of the present disclosure will be described hereinafter with reference to the drawings. Unnecessarily detailed description may be omitted herein. For example, details of well-known features and techniques and repetitive description of substantially the same configuration may be omitted. This omission is to avoid unnecessarily redundant description and to facilitate the understanding of the person in the art.

The inventor of the present disclosure provides the attached drawings and the following description in order to allow the person in the art to fully understand the invention, and does not intend to limit the scope of the claimed invention by the drawings and the description.

First Embodiment

Referring now to FIGS. 1-4, a first embodiment will be described.

[1-1. Configuration of Image Processor]

Figure 1:
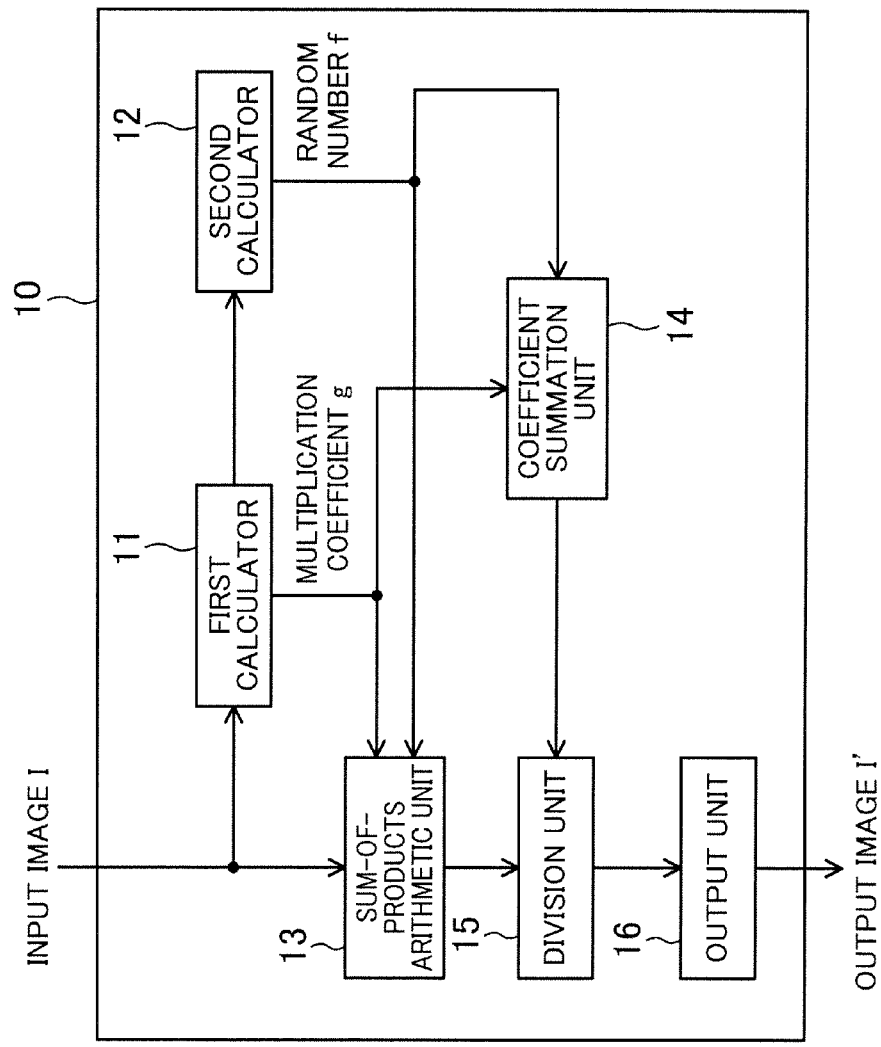
FIG. 1 is a block diagram illustrating a configuration of an image processor according to a first embodiment.

FIG. 1 is a block diagram illustrating a configuration of an image processor according to the first embodiment. An image processor 10 includes a first calculator 11, a second calculator 12, a sum-of-products arithmetic unit 13, a coefficient summation unit 14, a division unit 15, and an output unit 16.

The image processor 10 receives an input image I and performs noise smoothing represented by Equation (1) below on the input image I, thereby generating an output image I'. The output image I' is an image in which random noise (hereinafter referred to as "noise") included in the input image I has been reduced by noise smoothing. In this embodiment, an input image I refers to a monochrome image.

[Equation 1]

$$I'(x, y) = \frac{\sum_{u,v \in R1} (f(x, u, y, v) g(x, u, y, v) I(x+u, y+v))}{\sum_{u,v \in R1} f(x, u, y, v) g(x, u, y, v)} \quad (1)$$

where I(x, y) is an input image I, I(x+u, y+v) is a pixel (an adjacent pixel) adjacent o a pixel (x, y) included in the input image I, and I'(x, y) is an output image I'.

The first calculator 11 calculates g(x, u, y, v) shown in Equation (1). Here, g(x, u, y, v) is a multiplication coefficient (hereinafter referred to as a "multiplication coefficient g") of a target pixel represented as a pixel (x, y) and a reference pixel represented as a pixel (x+u, y+v) in the input image I. In Equation (1), u, v∈R1 represents adjacent regions, e.g., first and second regions 24 and 25 described later, adjacent to the pixel (x, y).

Figure 2:
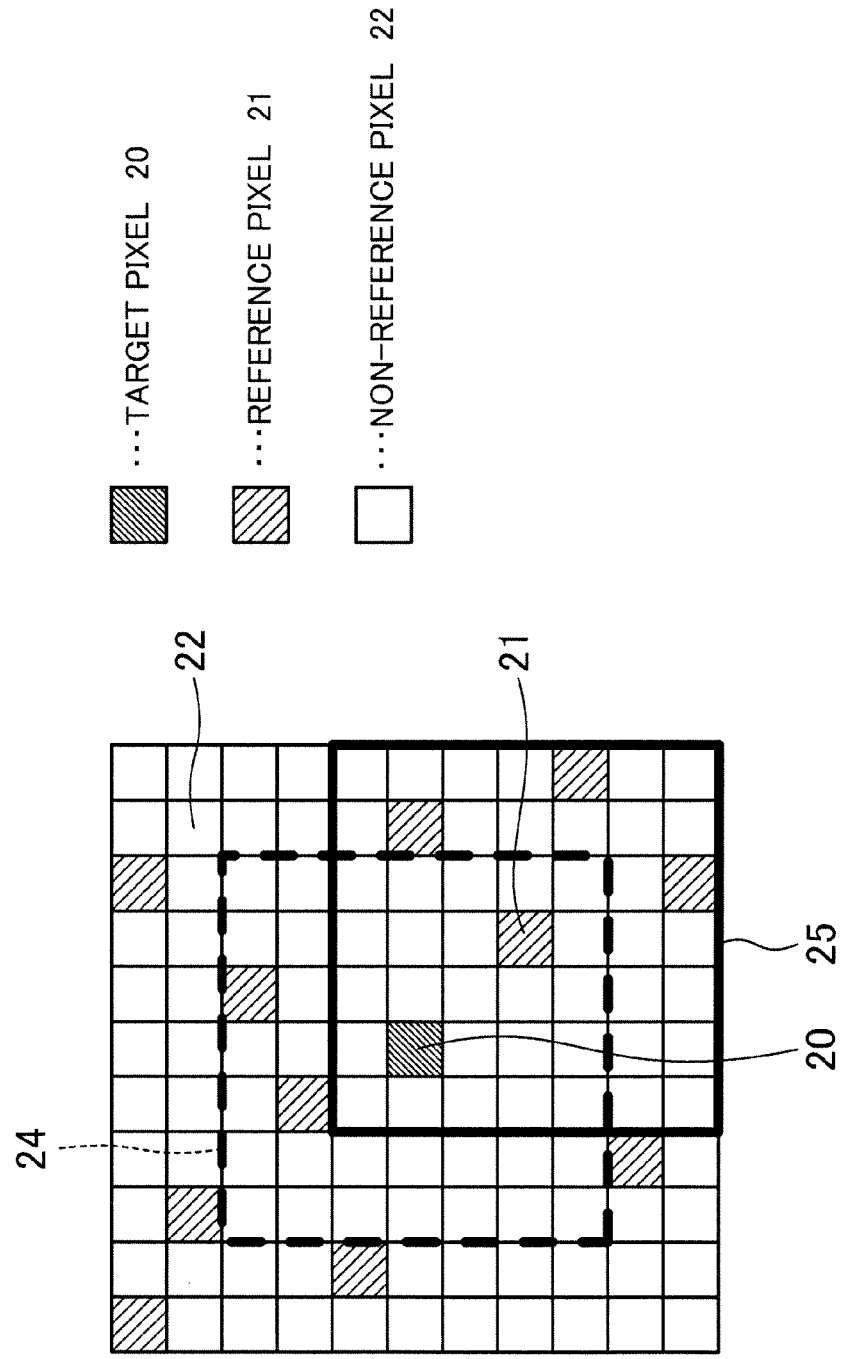
FIG. 2 is a flowchart showing operation of the image processor of the first embodiment.

FIG. 2 illustrates an example of an input image and pixels and regions in the input image. The input image I illustrated in FIG. 2 includes a target pixel 20 to be subjected to noise smoothing, a plurality of reference pixels 21 assigned with a first random value, and a plurality of non-reference pixels 22 assigned with a second random value. In this embodiment, a binary random number, e.g., 0 and 1, is assigned to each pixel in the input image I, and 1 is assigned as the first random value to the reference pixels 21. In the input image I, all the pixels do not need to be assigned with random numbers, and it is sufficient to assign random numbers to pixels in a range to be subjected to noise smoothing. The non-reference pixels 22 are assigned with 0 as the second random value.

In FIG. 2, a region surrounded by a dotted line is a first region 24 including a plurality of pixels with the target pixel 20 located at a center thereof. A region surrounded by a bold line is a second region 25 including a plurality of pixels with the one of the reference pixels 21 located at a center thereof. In this embodiment, the first and second regions 24 and 25 have the same shape.

The first calculator 11 determines similarity between the first and second regions 24 and 25 using Equations (2) and (3) below, and calculates a multiplication coefficient g based on the determination.

[Equation 2]

$$g(x,u,y,v)=w(S(x,u,y,v)) \quad (2)$$

[Equation 3]

$$S(x,u,y,v)=D(J(x,y),J(x+u,y+v)) \quad (3)$$

Equation (2) is used to calculate a multiplication coefficient g, and Equation (3) is used to calculate similarity between the first and second regions 24 and 25.

In Equation (2), S(x, u, y, v) represents similarity between a pixel (x, y) and a pixel (x+u, y+v). In this embodiment, a smaller S shows a larger degree of similarity between these pixels increases, whereas a larger S shows a larger degree of non-similarity between these pixels increases. In addition, w is a monotone decreasing function. The monotone decreasing function w herein is a function which decreases as the S increases, increases as the S decreases, and is, for example, a Gaussian function, an exponential function, a linear function, or a piecewise linear function.

In Equation (3), J(x, y) is the first region 24 including the pixel (x, y), and J(x+u, y+v) is the second region 25 including the pixel (x+u, y+v). In addition, D is a function for calculating the difference in pixel value between corresponding pixels in the first and second regions 24 and 25. That is, the use of the function D enables an S representing similarity to be calculated based on the difference in pixel value between corresponding pixels in the first and second regions 24 and 25.

In this embodiment, the similarity between the target pixel 20 and the reference pixel 21 is evaluated by using the similarity between the first and second regions 24 and 25, based on Equations (2) and (3). The function D may be a function for obtaining the sum of absolute differences between pixel values of corresponding pixels in the first and second regions 24 and 25 or a function for obtaining the sum of squares of differences between pixel values, for example.

As described above, the first calculator 11 calculates the multiplication coefficient based on the similarity between the first and second regions 24 and 25. Since the second region 25 is defined for each of the reference pixels 21 in FIG. 2, the first calculator 11 calculates multiplication coefficients g for the respective reference pixels 21.

The second calculator 12 calculates f(x, u, y, v) shown in Equation (1). Here, f(x, u, y, v) is a random number (hereinafter referred to as a "random number f") assigned to pixels in the input image I. The second calculator 12 may generate a random number f one by one, or may read a previously generated random number f from a memory or the like. An expected value e of the random number f is constant or substantially constant. For example, in FIG. 2, the expected value e of the random number f is 0.1. Here, as the random number f, a random value ("1" in this embodiment) assigned to the reference pixels 21 will be referred to as a random number f1.

The sum-of-products arithmetic unit 13 computes the numerator shown in Equation (1). Specifically the sum-of-products arithmetic unit 13 performs a multiplication of a pixel value of each of a plurality of reference pixels 21, a multiplication coefficient g associated with the reference pixel 21, and the random number f1, and also performs this multiplication for the plurality of reference pixels 21 to generate products. Then, the sum-of-products arithmetic unit 13 computes the sum of the products.

The coefficient summation unit 14 computes the denominator shown in Equation (1). Specifically, the coefficient summation unit 14 performs a multiplication of the multiplication coefficient g associated with each of a plurality of reference pixels 21 by the random number f1, and also performs this multiplication for the plurality of reference pixels 21 to generate products, and computes the sum of the products.

The division unit 15 performs division shown in Equation (1). Specifically, the division unit 15 performs averaging and generates an output image I'. Then, the output unit 16 outputs the output image I'. The output unit 16 is a video terminal such as a serial digital interface (SDI) terminal or a high-definition multimedia interface (HDMI) terminal.

[1-2. Operation of Image Processor]

Operation of the image processor 10 with the configuration described above will be described.

Figure 3:
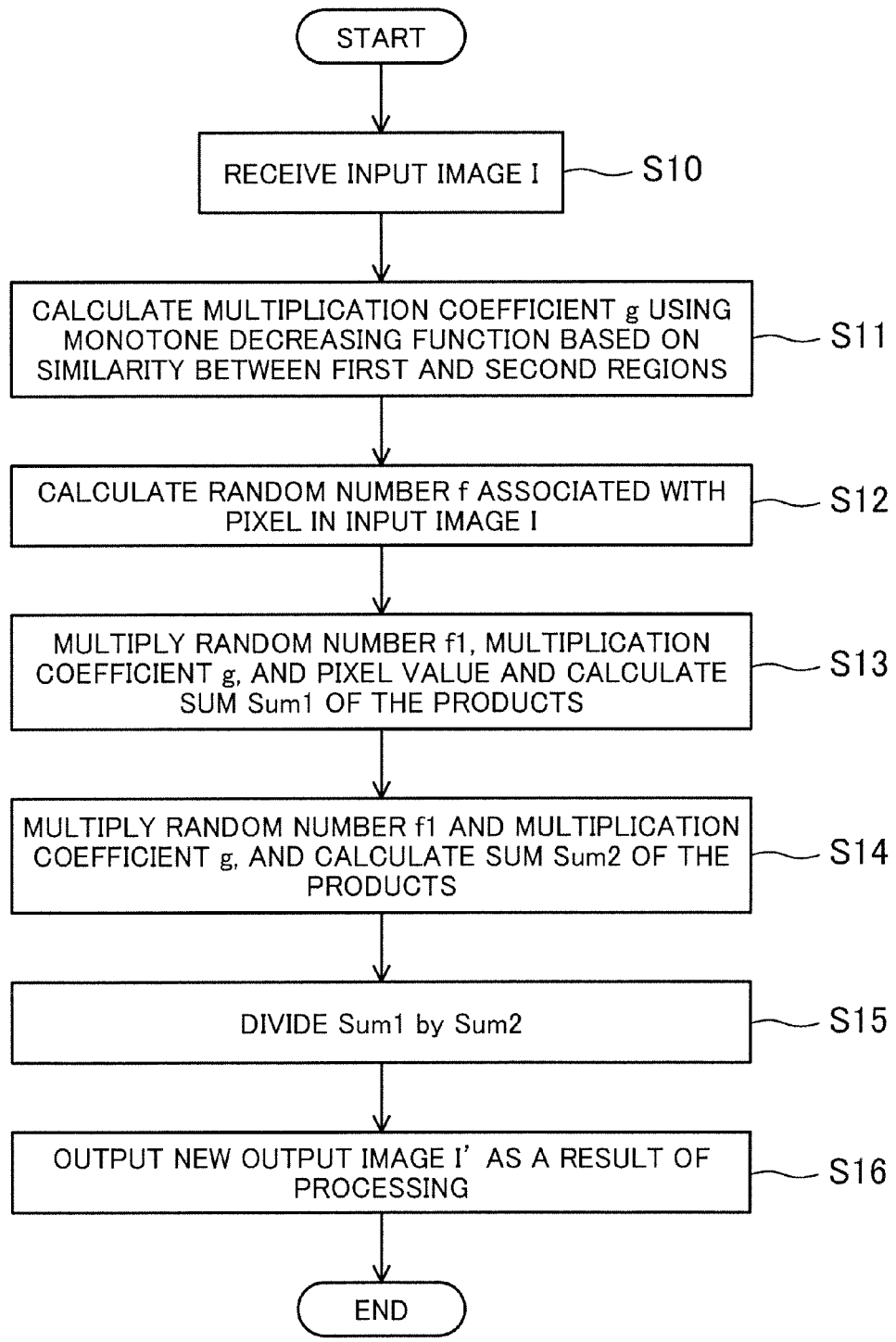
FIG. 3 illustrates pixels and regions in an input image.

FIG. 3 is a flowchart showing operation of the image processor of this embodiment.

First, in step S10, an input image I is input to the image processor 10.

In step S11, using a monotone decreasing function based on the similarity between the first region 24 and the second region 25, a plurality of multiplication coefficients g respectively associated with a plurality of reference pixels 21 included in the input image I are calculated.

In step S12, a random number f assigned to each pixel in the input image I is calculated. Accordingly, a random number f1 assigned to each reference pixel 21 is calculated.

In step S13, the pixel value of each of the reference pixels 21, the multiplication coefficient g associated with the reference pixel 21, and the random number f1 are multiplied together, and this multiplication is performed for the reference pixels 21 to generate products, and the sum Sum1 of the products is calculated.

In step S14, the multiplication coefficient g associated with each of the reference pixels 21 and the random number f1 are multiplied together, and this multiplication is performed for the reference pixels 21 to generate products, and the sum Sum2 of the products is calculated.

In step S15, the sum Sum1 is divided by the sum Sum2, thereby calculating the pixel value of the target pixel 20. The foregoing noise smoothing is repeatedly performed on all the target pixels 20 in the input image I, thereby generating an output image I'.

In step S16, the output image I' as a result of the foregoing processing is output. Step S11 and step S12 may be replaced with each other.

[1-3. Advantages]

As described above, in this embodiment, a multiplication coefficient g for the target pixel 20 and each reference pixel 21 is calculated using a monotone decreasing function based on the similarity between the first region 24 including the target pixel 20 and the second region 25 including the reference pixel 21. The reference pixels 21 are pixels assigned with the random number f1 out of the pixels included in the input image I. That is, the reference pixels 21 are present at random in the input image I.

Then, the pixel value of each of the reference pixels 21, the multiplication coefficient g associated with the reference pixel 21, and the random number f1 are multiplied together, and this multiplication is performed for the reference pixels 21 to generate products, and a sum Sum1 of the products is computed. In addition, a multiplication coefficient g associated with each of the reference pixels 21 and the random number f1 are multiplied together, and this multiplication is performed for the reference pixels 21 to generate products, and a sum Sum2 of the products is computed. The sum Sum1 is divided by the sum Sum2, thereby performing noise smoothing on the target pixel 20. In this manner, by performing noise smoothing on a plurality of pixels included in the input image I, an output image I' in which noise included in the input image I has been reduced is generated.

In this embodiment, the binary random number obtained from the second calculator 12 is used in the noise smoothing. Advantages obtained by this configuration will be described hereinafter.

Figure 4:
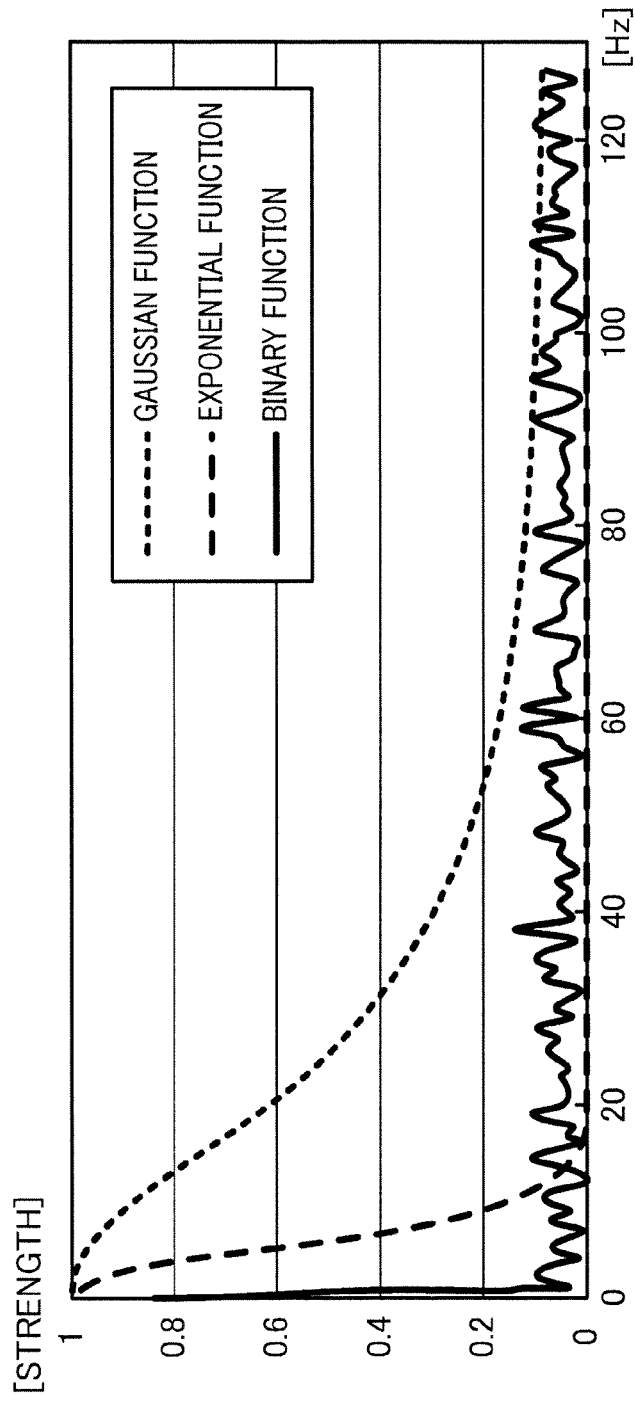
FIG. 4 is a graph showing frequency characteristics of a plurality of functions in noise smoothing.

FIG. 4 is a graph showing frequency characteristics of a plurality of functions in noise smoothing. As shown in FIG. 4, in the case of using an exponential function or a Gaussian function for noise smoothing, the strengths of low-frequency components are high and the strengths of high-frequency components are low among the frequency components of noise. In FIG. 4, a strength of 1 (one) means that noise is passed without any processing, i.e., noise appears in an output image without change. Thus, in the case of using an exponential function or a Gaussian function, a larger amount of low-frequency components of noise are passed, and the proportion of high-frequency components of noise is reduced to 10% or less. Accordingly, in noise smoothing using an exponential function or a Gaussian function, a large amount of frequency components of noise in a processed image are unevenly distributed to a low-frequency range. In other words, not only unnecessary noise but also noise necessary for maintaining the surface texture of the image, for example, might be removed. Such removal causes a human to feel the image as a computer graphics (CG).

On the other hand, in this embodiment, the binary random number f is assigned to each pixel, and pixels assigned with the random number f1 out of the binary random number f are defined as the reference pixels 21 as illustrated in FIG. 2. In this manner, in the noise smoothing using the binary random number, as shown in FIG. 4, the strength of frequency components of noise is substantially uniform from a low-frequency range to a high-frequency range. Accordingly, in the noise smoothing using the binary random number, both low-frequency components and high-frequency components of noise are substantially uniformly passed without any bias. The expression of being "substantially uniformly passed" means that about 10% or more of each frequency component of noise is passed, for example.

As described above, in this embodiment, it is possible to reduce uneven distribution of frequency components of noise to a low-frequency range, thereby maintaining frequency distribution characteristics of noise included in the input image I. That is, noise necessary for the output image I' can remain, resulting in that the output image I' appears to be a natural image to human vision.

In general, when a plurality of pixels included in an image are subjected to noise smoothing using random numbers irrespective of locations of the pixels, pixels showing great changes of pixel values, e.g., edges or patterns in the image, might be significantly degraded.

In this embodiment, the multiplication coefficient g for the target pixel 20 and each reference pixel 21 is calculated using the monotone decreasing function based on the similarity between the first region 24 including the target pixel 20 and the second region 25 including the reference pixel 21, thereby reducing the degradation described above. In addition, in this embodiment, since similarity not between pixels but between the first and second regions 24 and 25 is used, the influence of noise can be reduced, and the similarity can be determined with high precision.

In the foregoing embodiment, reference pixels for use in noise smoothing are selected at random. Thus, noise can be reduced while maintaining frequency distribution characteristics of noise included in an image.

—First Variation—

In the first embodiment, the input image I is a monochrome image. Alternatively, the image processor 10 may perform noise smoothing directly on a color filter array (CFA) image obtained through a CFA. A case where the input image I is a CFA image will be described hereinafter.

FIGS. 5A and 5B illustrate examples of images obtained through color filter arrays and pixels in the images. FIG. 5A illustrates an image obtained through four types of color filters of red (R), green (G), blue (B), and white (W). In FIG. 5A, the target pixel 20 is a pixel W, the reference pixels 21 are pixels W of the same color as the target pixel 20. In FIG. 5A, hatched pixels W which are the reference pixels 21 are assigned with 1 as the first random value.

FIG. 5B illustrates an example of an image obtained through a CFA with a Bayer pattern. In FIG. 5B, the target pixel 20 is a pixel G and the reference pixels 21 are pixels G of the same color as the target pixel 20. In FIG. 5B hatched pixels G, which are the reference pixels 21 are assigned with 1 as the first random value.

In FIGS. 5A and 5B, pixels except the target pixels 20 and the reference pixels 21 are non-reference pixels 22 (see FIG. 2) assigned with 0 as the second random value. As illustrated in FIGS. 5A and 5B, in a case where pixels, i.e., pixels constituting a CFA, are periodically arranged such that a pixel of the same color appears at every second pixel both vertically and horizontally in the drawings, each of the reference pixels 21 is located away from the target pixel 20 by an even-numbered row or column.

In the case of using a CFA image as illustrated in FIGS. 5A and 5B, the first and second regions 24 and 25 (see FIG. 2) may include pixels of a color different from that of the reference pixels 21. In this configuration, a larger number of pixels is used for determination of the similarity between the first and second regions 24 and 25, thereby enhancing precision in determining the similarity.

In the foregoing variation, noise included in an image can be reduced without performing demosaicing on a CFA image into a general color image.

In general, demosaicing performed on an image including noise causes noise of adjacent pixels of different colors to affect each other, resulting in that a color that is not actually present (a false color) in the image might be generated.

On the other hand, in this variation, noise smoothing can be performed directly on a CFA image, thereby eliminating the necessity of demosaicing. As a result, the above-mentioned false color is not generated.

This variation is directed to the case of using CFAs of four colors. However, the type and number of colors are not specifically limited. Pixels of CFAs may be arranged at random.

—Second Variation—

Then, a case of inputting a color image to the image processor 10 will be described. A color image includes a plurality of channels such as R, G, and B, or Y, Cb, and Cr. This second variation is applied to a color image including channels of Y, Cb, and Cr, for example.

FIGS. 6A and 6B illustrate examples of selection of reference pixels in a luminance image and a color difference image. FIGS. 6A and 6B illustrate images obtained from the same color image. FIG. 6A illustrates an example of a target pixel and a plurality of reference pixels assigned with 1 as the first random value in a Y (luminance) image. FIG. 6B illustrates an example of a target pixel and a plurality of reference pixels assigned with 1 as the first random value in a CbCr (color difference) image.

Here, an expected value e of the random number assigned to the pixels shown in FIG. 6A is, for example, 0.075, and an expected value e of the random number assigned to the pixels shown in FIG. 6B is, for example, 0.125. Accordingly, the number of reference pixels 21 in the color difference image is larger than the number of the reference pixels 21 in the luminance image.

In this manner, the expected value of the random number in the color difference image is made larger than that in the luminance image, thereby enhancing the effect of reducing noise included in the color difference image. It is sufficient to make the expected value of the random number differ between noise smoothing performed on the luminance image and noise smoothing performed on the color difference image.

Alternatively, a range where reference pixels are selected may be enlarged without making the expected values differ between the luminance image and the color difference image. Specifically, reference pixels may be selected in a pixel range of, for example, 10×10 in the luminance image, whereas reference pixels may be selected in a pixel range of, for example, 15×15 in the color difference image. In this manner, the range where reference pixels are selected may be made differ between the luminance image and the color difference image.

In general, an excessive removal of noise from an image might increase blur in the image. However, since spatial resolution for a color difference component is lower than that for a luminance component of an image in human visual performance, even when blur of an image increases due to removal of a larger amount of noise from a color difference image, human vision is not significantly affected. Accordingly, a human can see a color image in which a large amount of noise has been removed from a color difference image, as a natural image.

As described above, by changing the expected value of the random number depending on the channel constituting an image or changing the range where reference pixels are selected, the effect of removing noise can be efficiently enhanced with a subjective image quality maintained.

The expected value of the random number or the range where reference pixels are selected may be changed depending on the channel constituting a so-called RGB image, based on the strength and/or visibility of noise included in the RGB image.

—Third Variation—

In the second variation, the expected value of the random number or the range where reference pixels are selected is changed depending on the channel constituting a color image. Alternatively, the expected value of the random number or the range where reference pixels are selected may be changed based on the similarity between a target pixel and reference pixels in one image.

Figure 7A:
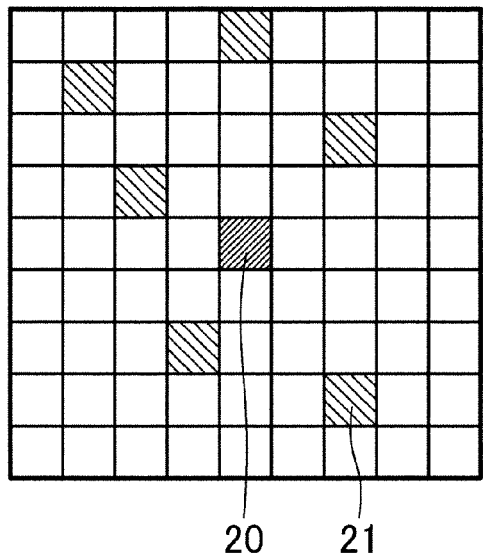
FIGS. 7A-7C illustrate examples of selection of reference pixels in one image.
Figure 7B:
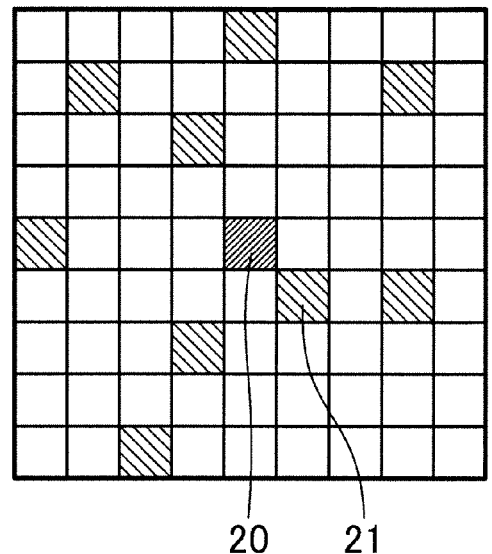
Figure 7C:
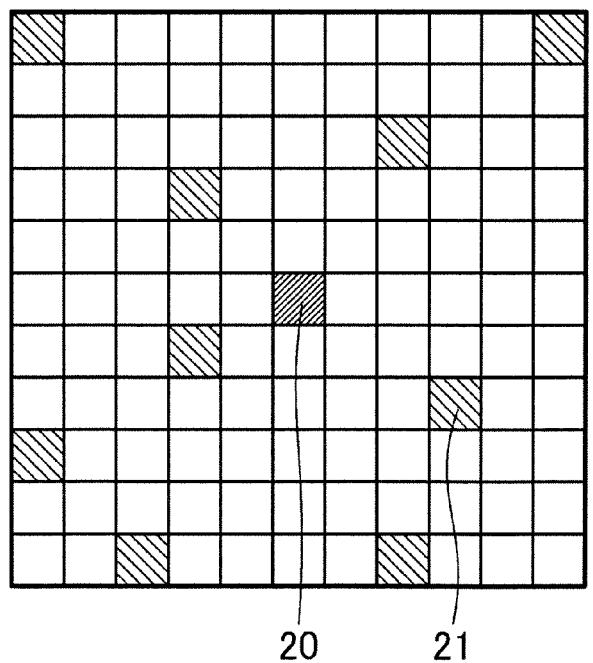

For example, in a case where a value (the denominator in Equation (1)) computed by the coefficient summation unit 14 for a target pixel 20 is small, the effect of averaging by the division unit 15 decreases. This decrease occurs in a pattern in which the target pixel 20 is surrounded by a small number of pixels similar to the target pixel 20. Accordingly, in such a case, the expected value of the random number or the range where reference pixels are selected may be changed so as to enhance the effect of removing noise. Referring now to FIGS. 7A-7C, this case will be specifically described.

FIGS. 7A-7C illustrate examples of selection of reference pixels in one image. FIG. 7A corresponds to a case where the expected value e of the binary random number is 0.075.

In a case where the value computed by the coefficient summation unit 14 is less than or equal to a predetermined value in noise smoothing on a target pixel 20 illustrated in FIG. 7A, the expected value e of the binary random number is increased in order to increase the number of reference pixels 21 for use in the noise smoothing FIG. 7B corresponds to a case where the expected value e of the binary random number is 0.125. By increasing the expected value e, the number of reference pixels 21 shown in FIG. 7B is made larger than that in FIG. 7A.

Alternatively, as illustrated in FIG. 7C, the range where reference pixels 21 are selected may be enlarged. In addition to the increase in the expected value e of the binary random number, the range where reference pixels 21 are selected may be enlarged. That is, in noise smoothing, the number of reference pixels 21 is increased.

As described above, in this variation, the effect of removing noise with respect to the target pixel 20 can be made uniform in an image, and in addition, the effect of removing noise in the image can be enhanced.

—Fourth Variation—

In the foregoing description, the image processor 10 performs noise smoothing on a single image such as a color image or a monochrome image. Alternatively, the image processor 10 may perform noise smoothing on a plurality of temporally sequential images. That is, the image processor 10 is also applicable to moving images.

FIGS. 8A-8C illustrate examples of selection of a target pixel and reference pixels in temporally sequential input images.

FIG. 8A illustrates an example of an input image at time t−1, FIG. 8B illustrates an example of an input image at time t, and FIG. 8C illustrates an example of an input image at time t+1.

In FIGS. 8A-8C, among the sequential input images, a target pixel 20 is selected in the input image shown in FIG. 8B, for example, and a plurality of reference pixels are selected in each of the input images shown in FIGS. 8A-8C. Specifically, the target pixel 20 is selected in one of the input images, and a plurality of reference pixels 21 are selected in each of the input images that have been input before and after the image including the target pixel 20. Accordingly, in this variation, the first region 24 (see FIG. 2) is defined in the image shown in FIG. 8B, and the second region 25 (see FIG. 2) is defined in each of the images shown in FIGS. 8A-8C.

Operation of the image processor 10 of this variation will now be described.

FIG. 9 is a flowchart showing operation of the image processor in a case where a plurality of images are input.

In step S20, an input image I is input to the image processor 10.

In step S21, using a monotone decreasing function based on the similarity between the first region 24 in the input image I and the second regions 25 in the input image I and the input images before and after the input image I, a plurality of multiplication coefficients g(t) associated with a plurality of reference pixels 21 included in each of the images at respective times are calculated. Each of the multiplication coefficients g(t) is obtained by incorporating the concept of a time axis direction in a multiplication coefficient g.

In step S22, a random number f(t) assigned to each of the images at the respective times is calculated. In this manner, a random number f1(t) assigned to each reference pixel 21 included in the images at the respective times is calculated. Each of the random number f(t) and the random number f1(t) is obtained by incorporating the concept of a time axis direction in the random number f and the random number f1.

In step S23, the pixel value of each of the reference pixels 21 at each time, the multiplication coefficient g(t) associated with the reference pixel 21, and the random number f1(t) are multiplied together, and this multiplication is performed for the reference pixels 21 to generate products, and the sum Sum1 of the products is calculated.

In step S24, the multiplication coefficient g(t) and the random number f1(t) are multiplied together, and this multiplication is performed for the reference pixels 21 to generate products, and the sum Sum2 of the products is calculated.

In step S25, the sum Sum1 is divided by the sum Sum2. The foregoing noise smoothing is repeatedly performed on all the target pixels 20 in the input image I, thereby generating an output image I'.

In step S26, the output image I' as a result of the foregoing processing is output. Step S21 and step S22 may be replaced with each other.

As described above, in this variation, a plurality of images in a time axis direction can be used in noise smoothing. Accordingly, the number of reference pixels 21 is larger than that in the case of performing noise smoothing using a single image, thus enhancing the effect of reducing noise.

—Fifth Variation—

The above fourth variation is directed to reduction of noise included in one image by using a plurality of images. Alternatively, noise smoothing may be performed on each of a plurality of images.

Figure 10A:
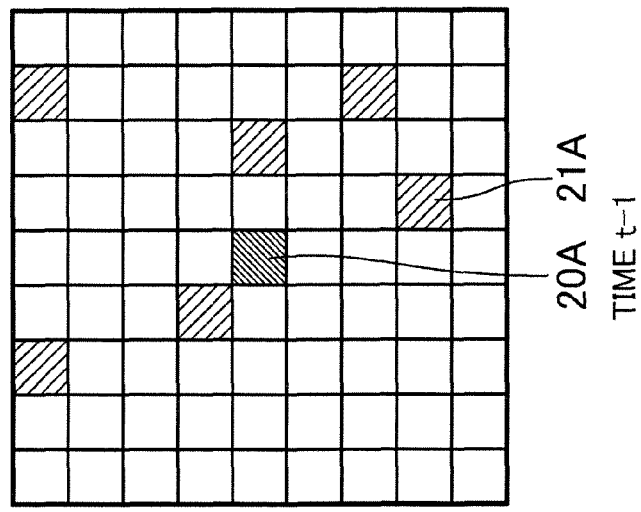
FIGS. 10A-10C illustrate other examples of selection of target pixels and reference pixels in a plurality of images.
Figure 10B:
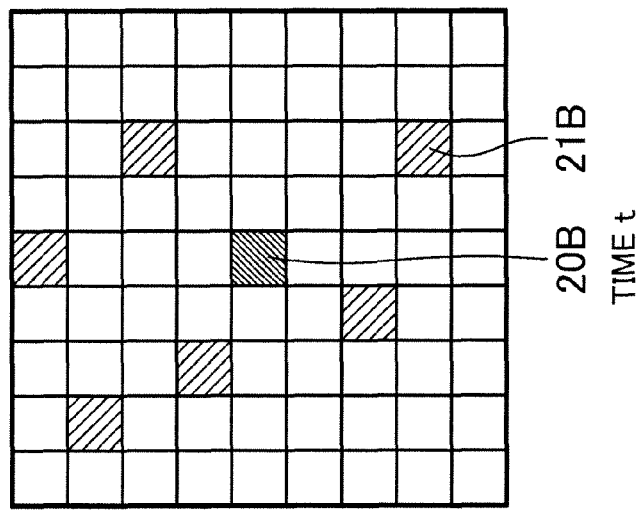
Figure 10C:
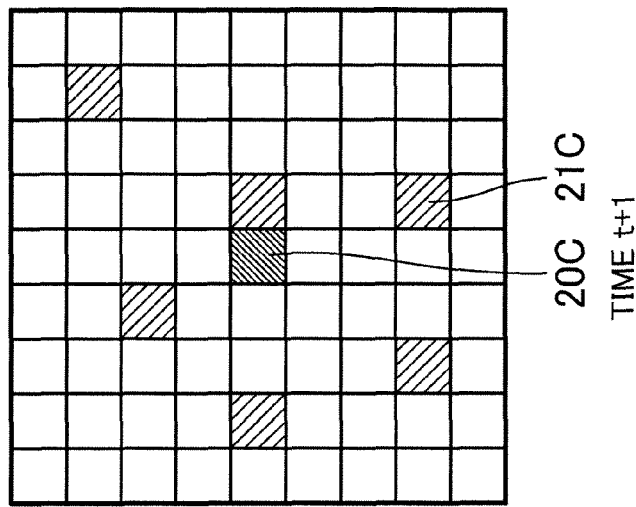

FIGS. 10A-10C illustrate other examples of selection of target pixels and reference pixels in a plurality of temporally sequential input images.

FIG. 10A illustrates an example of an input image at time t−1, FIG. 10B illustrates an example of an input image at time t, and FIG. 10C illustrates an example of an input image at time t+1.

In the images illustrated in FIGS. 10A-10C, target pixels 20A-20C are located at the same position. The reference pixels 21A-21C in the images respectively illustrated in FIGS. 10A-10C are located at different positions. That is, in the images at the respective times, random numbers f(t) are assigned to the target pixels 20A-20C at the same position such that the reference pixels 21A-21C are located at different positions. The expected values e of the random numbers f(t) in the images illustrated in FIGS. 10A-10C may be the same, and/or ranges where the respective reference pixels 21A-21C are selected may be the same.

As described above, in this variation, the effect of reducing noise for the pixels at the same position in sequential images changes with time. In addition, uneven distribution of temporal frequency components of noise remaining in the image to a low-frequency range can be reduced. Consequently, in the case of playing back a plurality of image as moving images, the moving images can preserve natural noise with little incongruities.

—Sixth Variation—

In the above-described first embodiment and the variations thereof, the binary random number is used. Alternatively, a ternary or more multi-value random number may be used.

Figure 11:
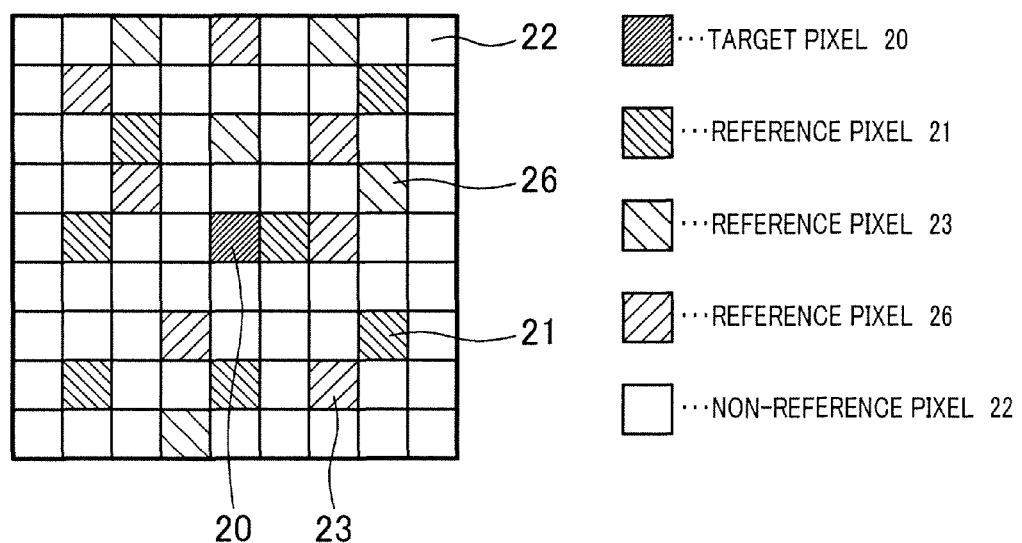
FIG. 11 illustrates an example of selection of reference pixels in the case of using a multi-value random number.

FIG. 11 illustrates an example of selection of reference pixels in the case of using a multi-value random number. In FIG. 11, the random number includes first through fourth random values each of which ranges from 0 to 1, for example. Reference pixels 21 are pixels assigned with the first random value (e.g., 1) as a random number. Reference pixels 23 are pixels assigned with a third random value (e.g., 0.6) smaller than the first random value and larger than the second random value (e.g., 0). Reference pixels 26 are pixels assigned with a fourth random value (e.g., 0.3) smaller than the third random value and larger than the second random value.

That is, in this variation, noise smoothing is performed on the target pixel 20 using the reference pixels 21, 23, and 26.

In this manner, the use of the multi-value random number allow the random values to be defined in small steps, as compared to the case of using a binary random number. Thus, it is possible to reduce the influence of a pixel with an extremely large or small pixel value that occurs unexpectedly.

Other Embodiments

The first embodiment and the first through sixth variations thereof have been described as examples of the technique of the present disclosure. However, the present disclosure is not limited to these examples, and is also applicable to other embodiments in which modifications, changes, substitutions, additions, and/or omissions, for example, are made as necessary. Further, components described in the first embodiment and the first through sixth variations may be combined as another embodiment.

Other embodiments will now be described.

In FIG. 1 for the first embodiment, the division unit 15 and the output unit 16 may be integrated together. In FIG. 2, the first and second regions 24 and 25 do not need to overlap with each other. The first region 24 do not need to include the reference pixel 21, and the second region 25 only needs to include at least one reference pixel. The target pixel 20 does not need to be at the center of the first region 24, and the reference pixel 21 does not need to be at the center of the second region 25. The shapes of the first and second regions 24 and 25 do not need to completely coincide with each other, and only need to be substantially the same. That is, it is sufficient to enable determination of the similarity between the first region 24 and the second region 25.

In the first embodiment, a plurality of functions are described as examples of the function w in Equation (2). Alternatively, these functions may be switched from one to another depending on the strength of noise included in the image. In the case of using one function as the function w, the shape of this function may be changed depending on the strength of noise included in the image.

In the first embodiment and the first through sixth variations, the random values and the expected values e are optional.

In the fourth and fifth variations, the plurality of images input to the image processor 10 does not need to be temporally sequential. The image at time t and at least one of the image before time t or the image after time t may be used.

The images illustrated in FIGS. 10A-10C for the fifth variation may be generated in the manner described in the fourth variation.

In the first embodiment and the first through sixth variations, noise smoothing is performed by the image processor 10 as hardware. Alternatively, noise smoothing may be implemented by software as a computer program.

The computer program may be distributed by being recoded on, for example, a computer-readable medium such as a compact disc read-only memory (CD-ROM), or through communication lines such as the Internet. This computer program is such an image processing program that makes a computer execute the processing shown in the flowchart shown in FIG. 3 or FIG. 9. That is, this image processing program makes a computer execute functions of the first calculator 11, the second calculator 12, the sum-of-products arithmetic unit 13, the coefficient summation unit 14, and the division unit 15 illustrated in FIG. 1. Both software and hardware may be used.

In addition, noise smoothing may be implemented by using one or more chip circuits such as a so-called digital signal processor (DSP) equipped with the above-described computer program.

The foregoing embodiments have been described as examples of the technique of the present disclosure. The attached drawings and the description are provided to show the examples.

Accordingly, the components shown in the attached drawings and the description may contain components unnecessary for solving the above-described problems as well as necessary components. Thus, the mere fact that such unnecessary components are shown in the attached drawings and the description should not address that these unnecessary components are necessary.

The foregoing embodiments are examples of the technique of the present disclosure, and thus, various modifications, substitutions, additions, and/or omissions, for example, may be made within the scope of the invention or its equivalent range as defined by the appended claims.

The present disclosure is useful as an image processor for reducing noise included in an image. Specifically, the present disclosure is applicable to digital still cameras, digital video cameras, cellular phones equipped with cameras, and smartphones. The present disclosure is also applicable to computer programs for reducing noise, and also to hardware such as DSPs equipped with such computer programs.

What is claimed is:

1. An image processor for performing noise smoothing on an input image, the image processor comprising:
   a first calculator configured to calculate, for each of reference pixels selected at random with respect to a target image in the input image, similarity between a first region including the target pixel and a second region including the reference pixel, and using the similarity, calculate a multiplication coefficient which increases as the similarity increases;
   a second calculator configured to calculate a random number assigned to each of the reference pixels;
   a sum-of-products arithmetic unit configured to perform a multiplication of a pixel value of each of the reference pixels by the multiplication coefficient for the reference pixel and the random number assigned to the reference pixel and perform the multiplication for the reference pixels to generate products, and compute a sum of the products;
   a coefficient summation unit configured to perform a multiplication of the multiplication coefficient for each of the reference pixels by the random number assigned to the reference pixel and perform the multiplication for the reference pixels to generate products, and compute a sum of the products; and
   a division unit configured to divide the sum obtained by the sum-of-products arithmetic unit by the sum obtained by the coefficient summation unit, and output a result of the division as a pixel value of the target pixel.

2. The image processor of claim 1, wherein
the input image is input to the image processor through a color filter, and
the target pixel and each of the reference pixels are of an identical color.

3. The image processor of claim 2, wherein
each of the reference pixels is located away from the target pixel by an even-numbered row or column.

4. The image processor of claim 1, wherein
the input image is a color image including a luminance image and a color difference image, and
the second calculator makes an expected value of the random number differ between the luminance image and the color difference image.

5. The image processor of claim 1, wherein
the input image is a color image including a luminance image and a color difference image, and
in the color difference image, a range where the reference pixels are selected is larger than that in the luminance image.

6. The image processor of claim 1, wherein
the first calculator determines similarity between the target pixel and each of the reference pixels, and
the second calculator changes an expected value of the random number depending on the determination of the similarity by the first calculator.

7. The image processor of claim 1, wherein
the first calculator determines similarity between the target pixel and each of the reference pixels, and
as the number of reference pixels showing a low degree of the similarity increases, a range where the reference pixels are selected in the input image enlarges.

8. The image processor of claim 1, wherein
the input image includes a plurality of input images input to the image processor,
the target pixel is selected in one of the plurality of input images, and
the reference pixels are selected in the input image in which the target pixel is selected and at least one of an input image input before the input image in which the target pixel is selected or an input image input after the input image in which the target pixel is selected.

9. The image processor of claim 8, wherein
the target pixel and the reference pixels are selected in each of the plurality of input images,
if the target pixel is located at an identical position in the plurality of input images, each of the reference pixels is located at different positions in the plurality of input images.

10. The image processor of claim 1, wherein the random number is a binary random number having a value of 1 or 0.

11. The image processor of claim 1, wherein the random number is a multi-value random number.

12. An image processing method for performing noise smoothing on an input image, the method comprising:

a similarity calculation step of calculating, by a processor, for each of reference pixels selected at random with respect to a target pixel in the input image, similarity between a first region including the target pixel and a second region including the reference pixel;

a first calculation step of calculating, by the processor, a multiplication coefficient which increases as the similarity increases, for each of the reference pixels;

a second calculation step of calculating, by the processor, a random number assigned to each of the reference pixels;

a sum-of-products arithmetic step of performing, by the processor, a multiplication of a pixel value of each of the reference pixels by the multiplication coefficient for the reference pixel and the random number assigned to the reference pixel and performing the multiplication for the reference pixels to generate products, and compute a sum of the products;

a coefficient summation step of performing, by the processor, a multiplication of the multiplication coefficient for each of the reference pixels by the random number assigned to the reference pixel and performing the multiplication for the reference pixels to generate products, and compute a sum of the products; and a division step of dividing, by the processor, the sum obtained in the sum-of-products arithmetic step by the sum obtained in the coefficient summation step, and outputting a result of the division as a pixel value of the target pixel.

13. A chip circuit, equipped with an image processing program, wherein the image processing program, when executed by a processor, causes the processor to perform:

a similarity calculation function of calculating, for each of reference pixels selected at random with respect to a target pixel in the input image, similarity between a first region including the target pixel and a second region including the reference pixel;

a first calculation function of calculating a multiplication coefficient which increases as the similarity increases, for each of the reference pixels;

a second calculation function of calculating a random number assigned to each of the reference pixels;

a sum-of-products arithmetic function of performing a multiplication of a pixel value of each of the reference pixels by the multiplication coefficient for the reference pixel and the random number assigned to the reference pixel and performing the multiplication for the reference pixels to generate products, and compute a sum of the products;

a coefficient summation function of multiplying the multiplication coefficient for each of the reference pixels by the random number assigned to the reference pixel and performing the multiplication for the reference pixels to generate products, and compute a sum of the products; and a division function of dividing the sum obtained by the sum-of-products arithmetic function by the sum obtained by the coefficient summation function, and outputting a result of the division as a pixel value of the target pixel.

* * * * *